United States Patent
Vrana et al.

[15] 3,668,412
[45] June 6, 1972

[54] APPARATUS FOR HARNESSING THE VERTICAL MOVEMENT OF OCEAN TIDES AND UTILIZE THE FORCE FOR GENERATING ELECTRICAL ENERGY

[72] Inventors: Charles K. Vrana, 60 Helen Lane; Jacqulyn G. Lawton, 402 Crescent St., both of Fort Myers Beach, Fla. 33931

[22] Filed: Oct. 27, 1970

[21] Appl. No.: 84,412

[52] U.S. Cl. ............................................................290/53
[51] Int. Cl. ........................................................F03b 13/12
[58] Field of Search ..........................................290/42, 53

[56] References Cited

UNITED STATES PATENTS 2,871,790  2/1959  Weills ..................................290/42 X
163,451   5/1875  Buckner, Jr. .........................290/53 X Primary Examiner—Bernard A. Gilheany
Assistant Examiner—W. E. Duncanson, Jr.
Attorney—Carl Miller

[57] ABSTRACT

An apparatus for harnessing the vertical movement of ocean tides and utilize the force for generating electrical energy, the apparatus being based upon the principal of a large float which exerts force upwardly at a time of a risen tide and a downward force due to gravity at a time of a fallen tide, said float is first securely captivated to the level of the prevailing low tide and which is then released at the height of the tide in order to contribute its full built up force of available energy, the vertical movements of the float being transmited from a vertical superstructure mounted upon the float to a rotatable gear mounted upon a rotatable horizontal shaft journalled in stationary stanchions, and the rotatable shaft thus driving an electrical generator or performing other useful work.

3 Claims, 6 Drawing Figures

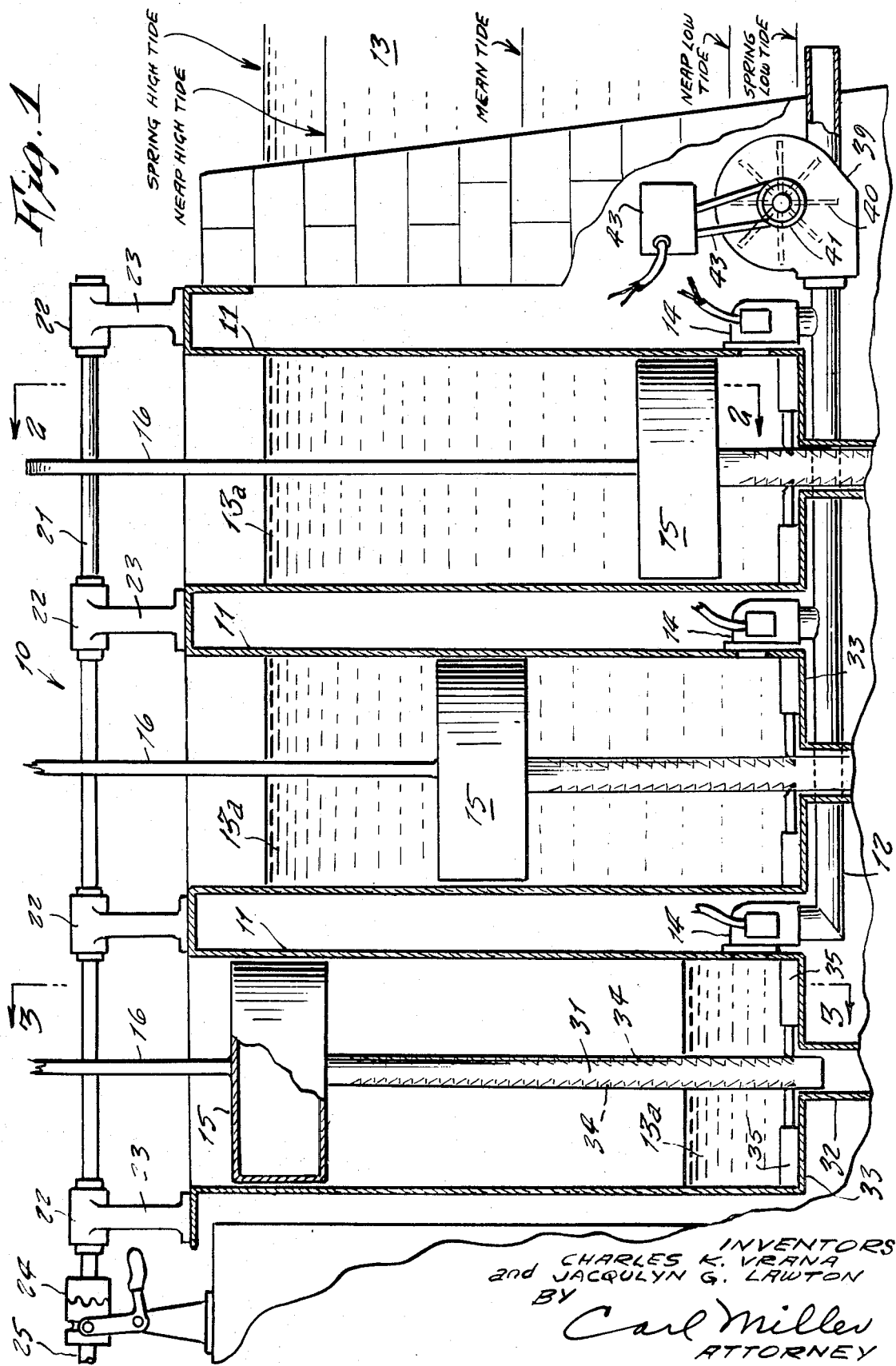

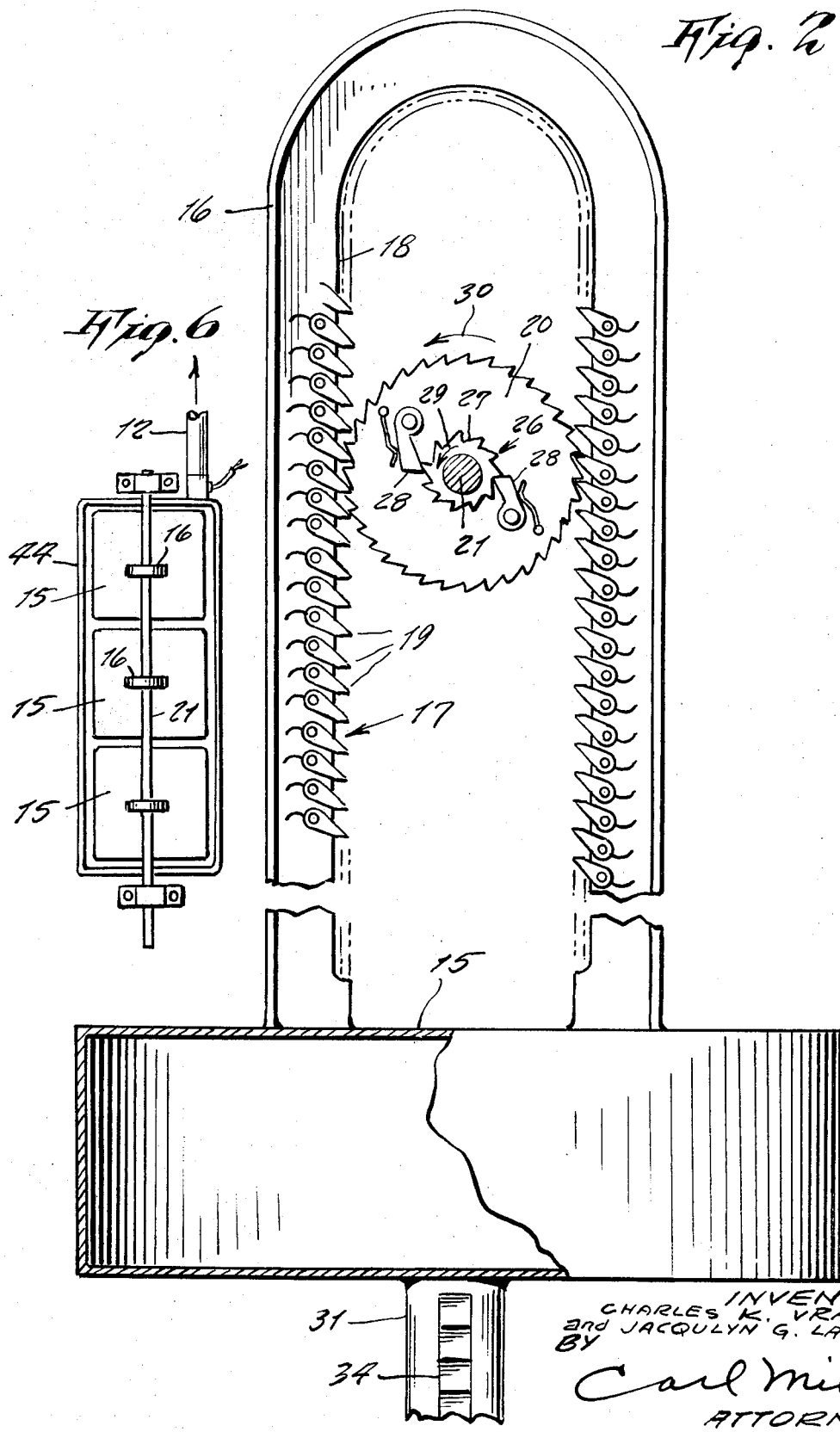

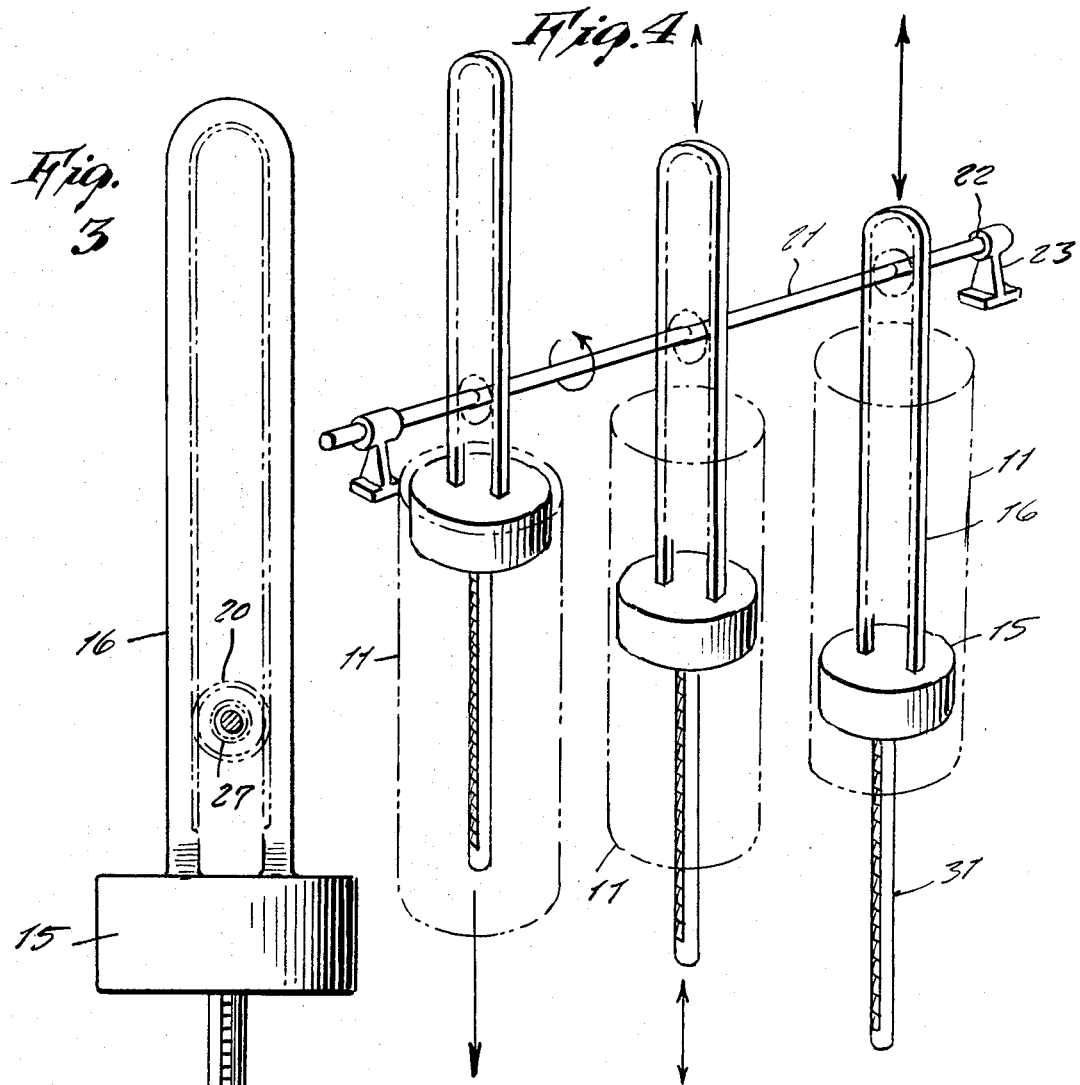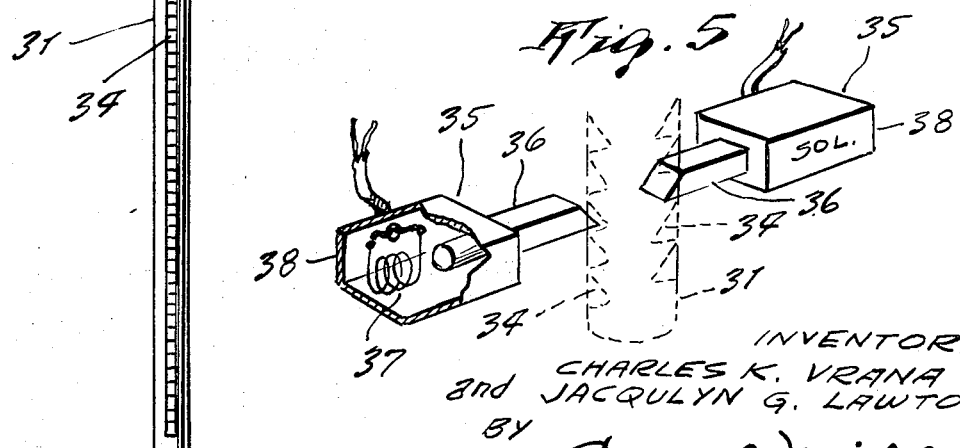

AN APPARATUS FOR HARNESSING THE VERTICAL MOVEMENT OF OCEAN TIDES AND UTILIZE THE FORCE FOR GENERATING ELECTRICAL ENERGY

This invention relates generally to machines powered by natural forces of the earth.

It is generally well known that all machines require an external force for driving the machine, such force comprising some form of energy power such as electricity, gasoline, steam or the like. All such energy powers that today are conventionally being used for driving machines involve cost in their production. Accordingly man has looked for a long time for a practical energy power to use that would be relatively free and also unlimited in supply. Man has therefore looked to natural forces and has accordingly attemped to harness the lightning and the ocean currents for acquiring limitless tremendous energy. Man has successfully harnessed the wind, rushing waterfall cataracts and even the ocean tides in an elementary manner. However heretofor the harnessing of the tides has been on a very limited experimental scale not suitable for any substantial energy production, because a practical commercial machine could not be developed, up to this time.

Accordingly it is a principal object of the present invention to provide a machine for harnessing the ocean tides in a practical manner so that the energy of a rising and falling tide could be utilized as a power for driving other driven machines used by mankind.

Another object is to provide a tide harnessing machine which incorporates principals that would permit the machine to be made on an enormous scale so that it would have an energy output of possibly millions of foot-pounds.

Yet another object is to provide a tide harnessing machine which, unlike conventional energy producing fuels such as coal or oil, does not cause any pollution of the atmosphere, the earth or the ocean waters, and which is 100 percent non-pollutant without the necessity of any pollution retarding mechanism being incorporated thereinto.

Yet another object is to provide a tide harnessing machine which accordingly can be installed strategically along the ocean coasts so to extract a maximum horsepower energy from the ocean tides, so that it could replace much of the use of coal and oils, thereby stopping the air pollutions being created by these fuels.

Another object is to provide a tide harnessing machine, which unlike coal and oil having only a limited supply thereof in the earth before being used up, is limitless and boundless in quantity which will never become diminished or exhausted.

Yet a further object is to produce a tide harnessing machine which requires practically no working personel in operating the machine, except such workmen for maintaining the machine in a self operating condition, and a control operator at a control panel for trafficing the enery output.

Yet another further object is to provide a tide harnessing machine which is of a relatively low construction on the level of the ocean surface so that even large installations thereof can be readily covered or hilled over so to form a natural landscape thereupon and thus preserve the environs of nature for enjoyment and relaxation for all generations instead despoiling them with the large power plants and tall smoke belching chimneys such as now ruin much of the shore lines.

Other objects are to provide a tide harnessing machine which is simple in design, inexpensive to manufacture, rugged in construction, easy to use and efficient in operation.

These and other objects will be readily evident upon a study of the following specification and the accompanying drawing wherein:

FIG. 1 is a side cross section of the invention.
FIG. 2 is a view on line 2—2 of FIG. 1.
FIG. 3 is a view on line 3—3 of FIG. 1.
FIG. 4 is a perspective schematic view of the invention.
FIG. 5 is a detail view of the remotely controlled locks.
FIG. 6 is a top plan view of a modified design of the invention wherein there are several floats within a single tank.

Referring now to the drawing in detail, the reference numeral 10 represents a tide harnessing machine according to the present invention wherein the figures illustrate a structure that rather incorporates the principals of the present invention, instead of actually showing the device of a practical sized scale; it being understood that the construction could be made on an enormeous scale so that a vast horsepower of energy could be developed.

The machine 10 as shown in FIG. 1 is comprised of a battery of individual tanks 11 each one of which is located at sea level and wherein each tank is of a depth so that the upper end of the tank extends at least to the elevation of spring high tide whereas the lower end of the tank extends downwardly to at least the elevation of Spring low tide so that the tank extends across all possible elevations of the sea level between extremes of tides. The lower end of the tank communicates by a duct 12 with the sea 13, each tank having valve 14 for controlling the entry or exit of sea water 13a to or from the tanks 11.

Within each tank 11 there is placed a float 15 which is able to rise and fall in response to the movement of the tides as the water 13a flows inwardly and outwardly of the tank through the duct 12.

Upon each tank 11 there is fixedly mounted a vertical stanchion 16 of inverted U-shaped configuration. The stanchion has a ratchet rack 17 secured along an inner edge 18 thereof, the rack being comprised of a series of individual ratchet pawls 19 for the purpose of engaging teeth on a circular ratchet wheel 20 that is supported on a driven shaft 21 which is supported rotatably free in bearings of stationary stanchions 23.

The end of the driven shaft 21 is connected by a clutch 24 to an output shaft 25 and used for driving various working machines. Each of the ratchet wheels 20 has a slip clutch 26 which disconnects the ratchet wheel 20 from the shaft 21 when the stanchion 16 is not in vertical movement, so that the shaft 21 may continue to rotate if another of the floats and its stanchion 16 is in a vertical movement and are thus driving the driven shaft 21. The slip clutch 26 includes a ratchet wheel 27 fixedly secured on the shaft 21, and pawls 28 mounted on ratchet wheel 20, the pawls 28 urging the ratchet wheel 27 to turn in a forwardly direction only as indicated by arrow 29. It is to be likewise noted that the ratchet pawls 19 urge the ratchet wheel 20 to turn in a forwardly direction only as indicated by arrow 30.

A downwardly extending post is secured to the underside of each float, the post 31 being slidable freely within a narrow post hole 32 that opens out on the bottom wall 33 of the tank 11. A toothed ratchet rack 34 is formed along opposite sides of the post 31, the racks 34 being selectively engageable by a pair of remotely controlled, electrically operated locks 35, shown in greater detail in FIG. 5. Each of the locks 35 includes a slidable bolt 36 that is slidable in either direction in response to a pair of solonoids 37 within a housing 38, so that the locks can selectively lock a float against vertical movement until a desired time, such as is shown with the floats in FIG. 1.

Thus in operative use, in order to maintain the driven shaft 21 in continuous rotation, the floats at high water level are released one at a time in sequence so that at all times a float is in vertical movement and thereby impart a drive movement to the driven shaft. Floats 15 are first secured at prevailing low tide.

In operative use, an additional horsepower output of energy is obtained by the installation of a turbine 39 along the duct 12 so that movement of sea water in either direction through the duct cause the turbine wheel 40 to rotate so to transmit motion through a pulley 41 and belt 42 to an electric generator 43, thus obtaining extra power free gratis.

As shown in FIG. 6, in a modified construction a series of several floats may operate as above described within a large singular tank 44 instead of each operating within its own individual tank as stated above.

The Sea Tide Motor is put along side of shore in natural or man made basins or tanks which has sea water inlet from the sea, said sea water inlet flow is controlled by a valve or control flood gate. When tide is high flood gate can be closed and the high sea water is held captive in the basins or tanks there even while the sea tide itself is going down to zero. This is advantageous because if the power production schedule calls for fast extra power production at low tide, the float can be released and power generated at a faster pace, to spend itself just as the sea tide is lowest, at which time the floodgate is opened and all the captivated water is emptied. At this point when the receeding water separates from the float, the held up float structure can be released to contribute to torque as it comes down. The water in the basin may now be completely emptied into the outside sea which sea tide is probably by now starting to come up. The floodgate at this point may be closed to prevent water to come into the basin while the structure is still coming down. This floodgate may be kept closed until the tide water outside reaches near peak or even peak. The floodgate is opened (the floats down and secured) and the water rushes in and fills up the tank in a very short time. Such manipulations of timing can produce power almost at the time wanted regardless of the rise and fall of tide time.

Facts and figures on floats 5 feet × 10 feet × 1 foot, in sea water at 64 lbs. per cubic foot. The dead weight of the structure of float, lock bar and racks should be approximately (but not necessarily) one-third to one-half of the buoyancy weight of the sea water displaced.

The upward buoyancy force of submerged floats plus structure weight on 5 feet × 10 feet × 1 foot floats is as follows:

SPRING TIDE 10 FEET

| 1 Foot | 2,000 Pounds |
| 2 Feet | 5,200 Pounds |
| 3 Feet | 8,400 Pounds |
| 4 Feet | 11,600 Pounds |
| 5 Feet | 14,800 Pounds |
| 6 Feet | 18,000 Pounds |
| 7 Feet | 21,200 Pounds |
| 8 Feet | 24,400 Pounds |
| 9 Feet | 27,600 Pounds |
| 10 Feet | 30,800 Pounds |
| | upward buoyancy at 10 feet depth. |

NEAP TIDE 6 FEET

| 1 Foot | 2,000 Pounds |
| 2 Feet | 5,200 Pounds |
| 3 Feet | 8,400 Pounds |
| 4 Feet | 11,600 Pounds |
| 5 Feet | !14,800 Pounds |
| 6 Feet | 18,000 Pounds |
| | upward buoyancy at 6 feet depth. |

When the float is coming down, there is only the 1,200 lbs. (gravity) structure weight (float, lock bar & racks) contributing to the torque of driven shaft.

Thus there is shown a tide harnessing machine having numerous advantages over other forms of power development. When a person contemplates the enormity of the world ocean coastline, it is evident that a power potential is available, free for use, which may be many times larger than the entire output of energy presently being made for man's total use.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus described our invention, We claim as new and desire to secure by Letters Patent is:

1. In a sea tide power gratis motor, the combination of a battery of tanks at sea level which at their upper and extend upward at least to a spring high tide elevation, and at their lower end extend downwardly at least to a spring low tide elevation, said tanks each having a free float, a duct communicating between each said tanks and adapted to communicate with a sea, so that sea water can flow inward and outward of said tanks, means of converting vertical movement of said floats into usable energy, and means to captivate or exclude sea water in said tanks, wherein each said float has an inverted U-Shaped stanchion mounted thereupon, a ratchet rack along an inner edge of said stanchion engaging a ratchet wheel mounted on a driven shaft rotatably journaled in stationary bearings and connected through a clutch to an output shaft for powering various other machines, wherein each said ratchet wheel includes a slip clutch for disconnecting said ratchet wheel from said shaft when not powering the same, wherein a vertical post secured to an underside of said float has a series of teeth along opposite sides thereof, said teeth being engageable by sliding bars of remotely controlled electric locks, so to lock said floats from vertical movement until so wished.

2. The combination as set forth in claim 1 wherein a turbine installed along said duct serves to harness energy from sea water moving in either direction through said duct, said turbine driving an electric generator.

3. In sea tide power gratis motor, a tank at sea level which at the upper end extends upward at least to a spring high tide elevation, and at the lower end extending downwardly at least to a spring low tide elevation, said tank having a plurality of free floats, a means to secure said floats from vertical movement until so desired, a duct communicating between said tank and adapted to communicate with a sea, so that sea water can flow inward and outward of said tank, means of converting vertical movement of said floats into usable energy and means to captivate or exclude sea water in said tanks.

* * * * *